STUBBS & DAVIS.
Evaporating Pan.
No. 66,750.
Patented July 16, 1867.
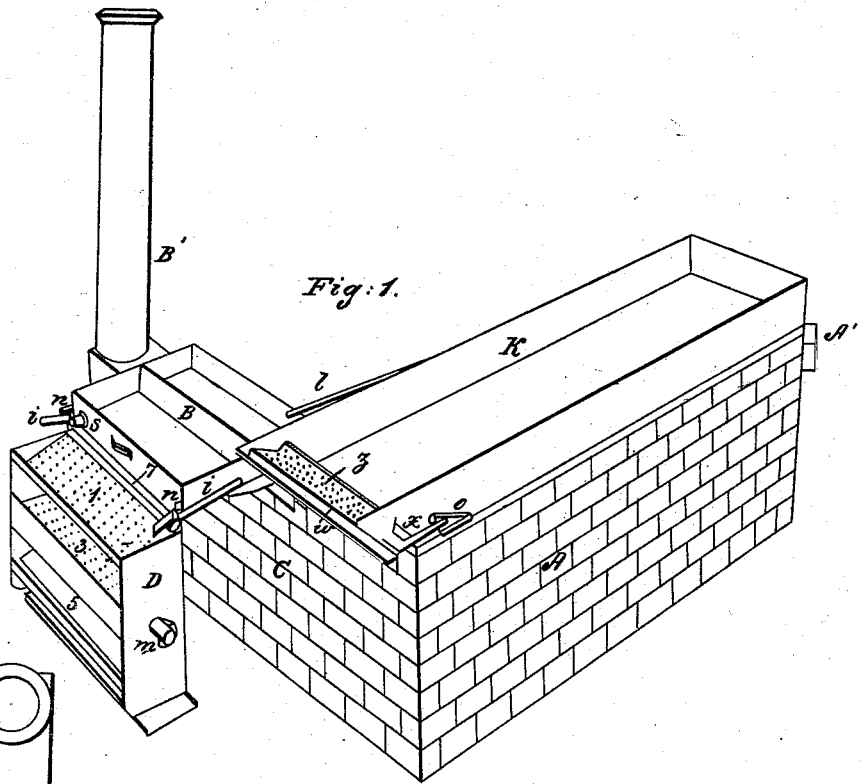
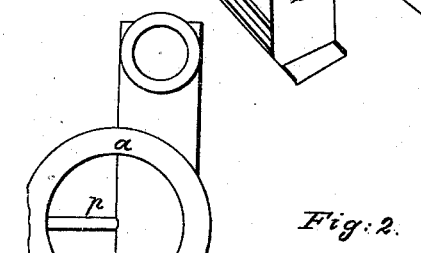
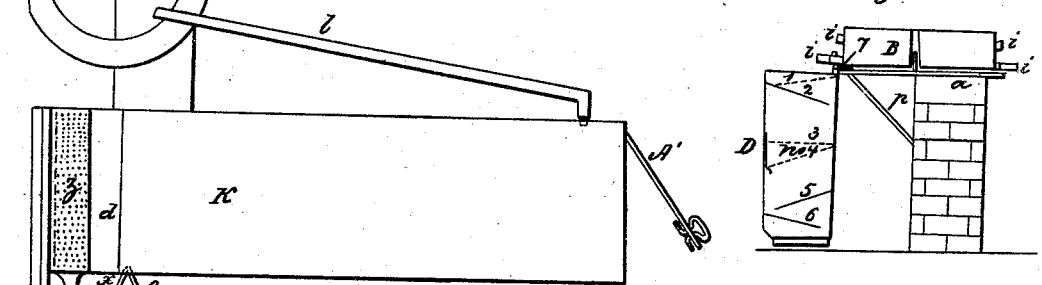
Witnesses:
A. J. Peck
S. E. Peck
Inventors:
Enoch E. Stubbs
Thomas C. Davis
by their atty.
H. P. K. Peck

United States Patent Office.

ENOCH E. STUBBS AND THOMAS C. DAVIS, OF WEST ELKTON, OHIO.

Letters Patent No. 66,750, dated July 16, 1867.

IMPROVEMENT IN EVAPORATING-PANS.

---

The Schedule referred to in these Letters Patent and making part of the same.

---

TO ALL WHOM IT MAY CONCERN:

Be it known that we, ENOCH E. STUBBS and THOMAS C. DAVIS, of West Elkton, in Puebla county, in the State of Ohio, have invented new and useful improvements in Evaporating Pans; and we do hereby declare that the following is a full and exact description thereof, reference being had to the accompanying drawings and to the letters of reference marked thereon.

Figure 1 is a perspective view of our invention as applied upon a furnace.

Figure 2 is top view of the same with the revolving-pan B removed.

Figure 3 is a transverse sectional view of the revolving-pan B, with the cooler and granulator attached.

Figure 4 is a transverse sectional view of the skimming and straining apparatus at the end of pan K.

The object of our invention is to facilitate the making, cooling, and granulating of molasses, and particularly designed for making sorghum molasses and sugar. The furnace A C, of ordinary construction, is in form like the letter L, with the part A standing at an elevation of about twelve inches above the part C, upon which the pan B rests. The pan K is provided with an apparatus for separating the scum from the sirup. That end of the pan K to which the skimming and straining apparatus is connected is slightly elevated. This apparatus consists of the trough $v$, strainer $z$ above it, and the angular trough $w$. The trough $v$ has an elbow pipe connecting its end with a spout, $o$, as represented in the drawings. The bottom portion of the pan K, next the trough $v$, is inclined downwards, as seen at $d$ in fig. 4. The pan B is pivoted in its centre, so as to be easily revolved upon its turn-table $a$. The turn-table is arranged with its centre upon the top of one of the side walls of the furnace, so as to permit but one of the divisions of pan B to rest over the furnace at a time. The revolving-pan B is provided with four spring-catches, $i\ i$, and the granulator D is furnished with a flange, projecting from the rear top edge thereof, which rests upon the edge of turn-table $a$; also with two projecting rods or arms, $n\ n$, which serve to hold the granulator in position. The projecting arms are held by the spring-catches $i\ i$, as represented in figs. 1 and 3. Each division of pan B is provided with an orifice for drawing off the sirup from time to time. The granulator and cooler D is constructed with inclined shelves, and strainers 1 2 3 4 5 6, and with a trough at its bottom for conveying the granulated and cooled molasses to a receptacle. A tube, $l$, is employed for conveying sirup from the front end of pan K to either of the divisions of pan B. The projecting side of turn-table $a$ is supported with brace $p$. A' is the furnace door, and B' the chimney. The tubes $m\ m$, at the ends of the granulator D, are designed for passing a current of air through the granulator and cooler between the two strainers, 3 and 4, which may be done by any ordinary means of causing a current of air to enter the granulator and commingle with the jets of molasses which are passing through the strainers. Any suitable utensil, of a width corresponding with the width of pan K, may be used for drawing the scum and refuse matter from the boiling sirup up the incline $d$, into strainer $z$, and after draining off the sirup, which will return through pipe $x$ to the elevated end of pan K, the residue will be drawn over into trough $w$, which conducts it to the ground. When the sirup is sufficiently reduced in pan K, a portion may be conducted through tube $l$ to pan B for finishing; and when finished, pan B is revolved upon its turn-table, so as to bring the division containing the finished molasses outside of the furnace, when the other division of pan B is ready to receive a supply of sirup. The pan now is in place to be connected with the cooler and granulator D, which is placed with its flange, 7, between the bottom of the pan K and the projecting turn-table $a$, and with its arms $n\ n$ within the spring-catches $i\ i$, which will hold the granulator and cooler in connection with pan B to receive the molasses from one or more orifices, 8, in the side of the pan. The effect of this mode of rapidly cooling the molasses, and of breaking it into small divisions or jets, is to conduce greatly to bleachen and granulate it. When one of the divisions of pan B is emptied the granulator and cooler is detached by pressing the spring-catches $i\ i$ outwardly, and tilting the cooler and granulator out of connection with the emptied division; then the pan B may be turned upon its pivot to bring the other division in proper position to connect it with the granulator in the same manner. By our construction and arrangement of pans, with their connections of skimming, cooling, and granulating apparatus, the operations of manufacturing molasses are facilitated, and the product is improved and cheapened. By the use of our invention the progress of the work need not be interrupted for the purpose of finishing, cooling, or conveying the molasses to its final receptacle, as all the operations can be easily performed at the same time. This we deem an important consideration, especially in the manufacture of sorghum molasses in the northern States, where the season in which this branch of manufacture is mostly conducted is very short. It will be observed that the inclined shelves of the cooler and granulator which are not perforated do not extend entirely across the granulator, which allows the molasses to pass over considerable extent of cooling surface before it reaches the trough at the bottom of the granulator.

Having now fully described our improvement in evaporating-pans, what we claim and desire to secure by Letters Patent, is—

1. The skimming apparatus, consisting of the trough $v$ and tube $x$, in combination with trough $w$ and strainer $z$, arranged at the elevated end of the pan K for draining the sirup from the extraneous matter, in the manner and for the purpose described.

2. The spring-catches $i\ i$, arranged in the manner described upon the pan B, to act in connection with the projecting edge of turn-table $a$ for holding the granulator and cooler D in position, in the manner and for the purpose specified.

In testimony whereof we have hereunto set our hands this 7th day of January, 1867.

ENOCH E. STUBBS,
THOMAS C. DAVIS.

Witnesses:
H. P. K. PECK,
A. L. PECK.